Patented Nov. 7, 1944

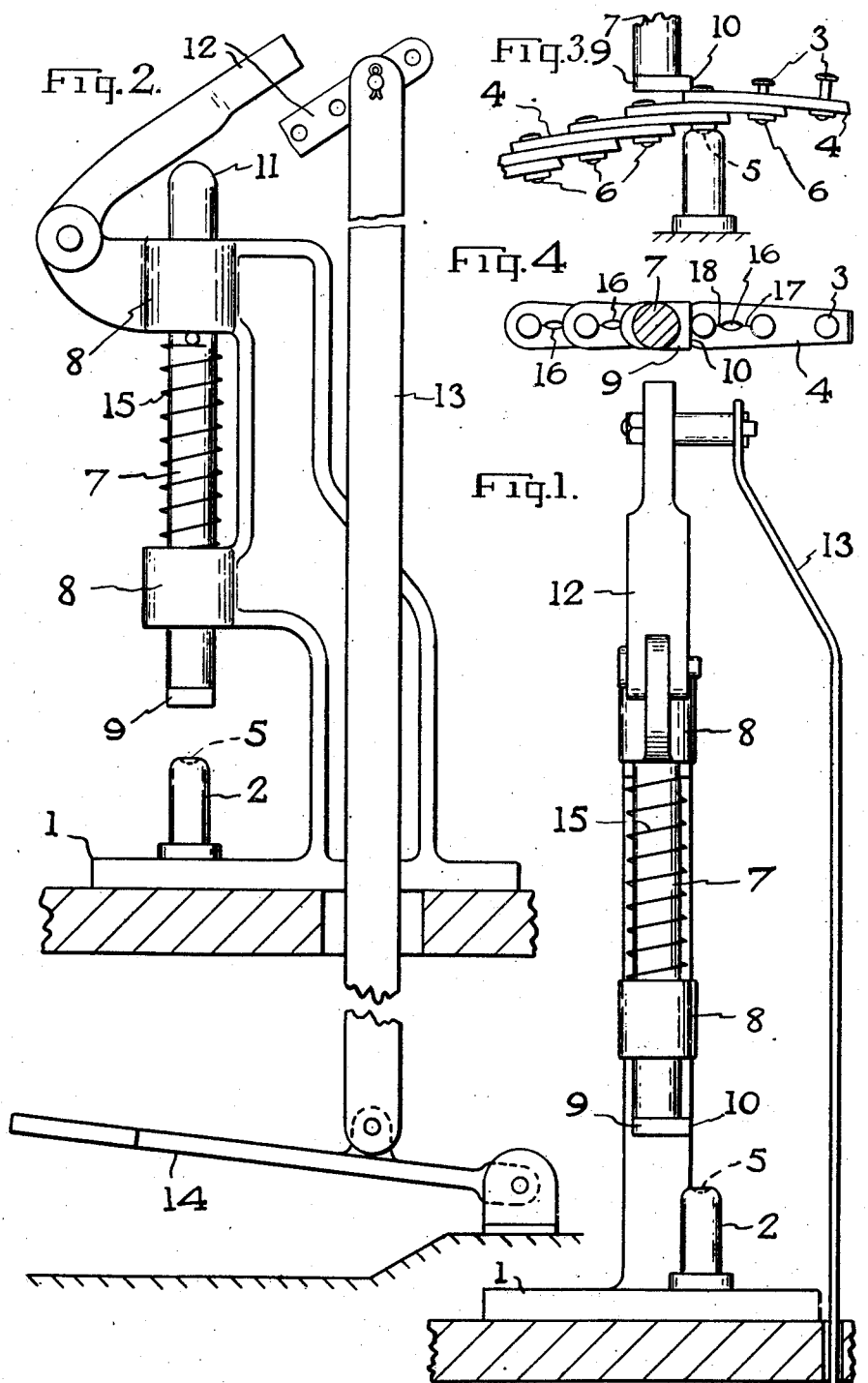

2,362,185

UNITED STATES PATENT OFFICE 2,362,185

ASSEMBLING OF LAMINATED DRIVING BELTS

Harry Brammer, Leeds, England

Application February 28, 1944, Serial No. 524,333
In Great Britain January 15, 1943

9 Claims. (Cl. 29—235)

This invention relates to the assembling of laminated driving belts of the kind comprising a number of superimposed detachable links formed from pieces of leather, rubber, rubberised fabric, or similar material, and secured together by studs, one end of which is riveted to a link whilst the other end carries an integral head, which is passed through a hole or holes in the adjacent link or links.

This invention especially relates to belting comprising links to which the studs are attached at one end, the links having holes and/or slots at one or more positions along their length, which are joined by slits extending between the holes and/or slots. The links are assembled by passing each of the headed studs through a hole or slot in the adjacent link and then forcing it through a slit into an intermediate hole in such link (or links). If there are further superimposed links (depending upon the number of laminations in the belt) the said stud is passed through them in a similar manner. The stud is then passed through a hole or slot in the outermost link for it to be forced through a slit into the end hole in such link. This assembly has hitherto been carried out solely by free manual flexion and manipulation of the links and needs considerable practice before the assemblers become skillful.

The object of this invention is to provide means which facilitate the assembling operation.

According to my invention a machine for use in assembling laminated belting connected by studs riveted to one of the links, comprises a rest member to receive each stud in turn, a plunger having a working stroke to approach the rest member but with its axis out of alignment therewith and a pressure element on the plunger to exert pressure on the uppermost link of the belting adjacent the stud head so that the latter is forced through the said link and can be forced easily into position by the assembler or machine operator flexing the links whilst the pressure element is on the said uppermost link. The pressure element may project laterally from the lower end of the plunger but terminate short of the position assumed by each stud on the rest member. The rest member may have means for locating a stud to be threaded through the superposed links.

Referring to the accompanying drawing an embodiment of the invention is shown by way of example only:

Figs. 1 and 2 are respectively a front and a side view of the improved machine;

Figs. 3 and 4 are respectively a detailed front and plan view showing belt links held by the pressure element on the work rest.

The illustrated construction comprises a work plate 1 carrying an upstanding rest member 2 in the form of a cylindrical block, which has a flat top. To locate a stud 3 secured to a belt link 4, a recess 5 is formed in the top of the member 2 to receive the lower riveted end 6 of the stud. The rest member is of a comparatively small diameter to afford free and sharp flexing of belt links 4.

A spring loaded or returned plunger 7 is mounted in bearings 8 arranged on a higher plane than the rest member 2 so as to have a working stroke in a line parallel, but out of alignment, with a vertical line struck through the stud receiving recess 5 in the rest member. The plunger is prevented from rotating by a key or equivalent means. On the end of the plunger is formed or fixed a pressure element 9 which comprises a flat or other shaped plate projecting laterally towards the said line through the recess. The edge 10 of the pressure plate is preferably, but not necessarily, straight and terminates a predetermined distance short of said line depending upon the size of links that are to be assembled. If desired the plate may have a step or rib at the edge 10 beneath the plate, and/or the edge may be concave to partially embrace a stud head without hindering its passage through a link.

The plunger may be operated in any convenient manner, e. g., its upper end 11 is engaged by a pivoted lever 12 which is connected by a link 13 to a foot treadle 14 by means of which the plunger is depressed. The plunger will be returned by its spring 15 to its inoperative position.

The particular type of belt shown comprises links which each taper in length to one end (to which a headed stud 3 is riveted) and have two holes, to receive the studs 3 on other links, with a slot 16 between them communicating with the said holes by means of slits 17, 18.

In assembling this type of belt, the stud 3 of the first link 4 is threaded by hand through the slot 16 in the first superimposed link and drawn into position through the slit 17. The said stud is located on the rest member and threaded through a further link (or links) by depressing the pressure plate 9 on to such link so that the stud head is forced through the slot 16 in the link and then by flexing the links and maintaining the pressure the stud slips through the slit 18 in the link into position in its stud hole in the link end. The pressure is then released and the links moved along to the next stud and the operation repeated. This pressure and flexing operation, which can be carried out with considerable speed, is repeated at each stud until a given length of belting is assembled. The offset pressure plate does not interfere with the passage of the stud head through a link and forces the latter down over such head and holds the link firmly for the final stud movement. It is sometimes necessary to press on to the outermost link nearer to the slot 16, then to release the pressure momentarily and move the outermost link slightly by flexion from beneath the element 9 after the head has been forced through the slot 16 in the link and prior to the passage of the stud through its slit. The machine could be used to force headed studs through holes or slots in which the studs have to remain.

What I claim is:

1. Machine for use in assembling laminated belting connected by studs riveted to one of the links, comprising a rest member to receive each stud in turn, a plunger having a working stroke to approach the rest member but with its axis out of alignment therewith and a pressure element on the plunger to exert pressure on the uppermost link of the belting adjacent the stud head so that the latter is forced through the said link and can be forced easily into position by the assembler or machine operator flexing the links whilst the pressure element is on the said uppermost link.

2. Machine for use in assembling laminated belting connected by studs riveted to one of the links, comprising a rest member to support each stud in turn, a plunger having a working stroke towards the rest member but out of alignment with the latter, a pressure element on the plunger to exert pressure on the uppermost link of the belting to force a stud head through the said link, said pressure element projecting laterally on the same side as the rest member is situated on, and means for causing the plunger to approach the rest member at will.

3. Machine for use in assembling laminated belting connected by studs riveted to one of the links, comprising a rest member adapted to receive the base of each stud in turn, a vertical plunger held in a raised position by a spring, the axis of said plunger being out of alignment with that of a stud when resting on the rest member, a pressure element on the lower end of the plunger projecting laterally towards the rest member but terminating short of the position assumed by the stud on the rest member, and means for forcing the plunger down so that the pressure element exerts pressure on the uppermost link and forces the stud head through the opening provided in the link.

4. Belt assembling machine as defined in claim 3, wherein the pressure element terminates in a straight edge.

5. Belt assembling machine as defined in claim 3, characterised by the pressure element comprising a flat plate.

6. Machine for use in assembling laminated belting connected by studs riveted to one of the links, comprising a rest member to support the belt stud to be threaded through superposed links, means for locating the stud in position for the threading operation, a spring returned plunger slidably mounted vertically in bearings out of alignment with the stud locating means, means for giving the plunger a downward working stroke and a laterally projecting pressure element on the lower end of the plunger having a straight outer edge to lie transversely on the uppermost link of the belting in such a position that pressure exerted on said link by the element forces the stud head through the opening provided in the link.

7. Belt assembling machine as defined in claim 6, characterised by the stud locating means comprising a recess adapted to receive the base of each stud.

8. Belt assembling machine as defined in claim 1, wherein the rest member comprises a block which provides a comparatively small area for the belting to rest upon to afford free and sharp flexing of the belt links during the assembling operation.

9. Machine for use in assembling laminated belting connected by studs riveted to one of the links, comprising a rest member to support the belt studs, a recess in the upper surface of said member to locate the base of each stud in turn, a vertical spring returned plunger mounted slidably in bearings out of alignment with said recess, a pressure element on the lower end of said plunger projecting laterally on the side the rest member is arranged, a pivoted lever associated with the upper end of said plunger and a foot treadle connected to said pivoted lever to operate it for thrusting the plunger downwardly

HARRY BRAMMER.